(12) United States Patent
Chen et al.

(10) Patent No.: US 6,921,057 B2
(45) Date of Patent: Jul. 26, 2005

(54) ROTARY SUPPORTING BASE FOR A DISPLAY DEVICE

(75) Inventors: Andy Chen, Chung Ho (TW); Kevin Chen, Chung Ho (TW)

(73) Assignee: Top Victory Electronics (Taiwan) Co., Ltd., Taipei Hsien (TW)

( * ) Notice: Subject to any disclaimer, the term of this patent is extended or adjusted under 35 U.S.C. 154(b) by 0 days.

(21) Appl. No.: 10/611,956

(22) Filed: Jul. 3, 2003

(65) Prior Publication Data
US 2004/0178314 A1 Sep. 16, 2004

(30) Foreign Application Priority Data
Mar. 11, 2003 (TW) ...................................... 92203696 U

(51) Int. Cl.[7] .............................................. A47B 49/00
(52) U.S. Cl. .................... 248/349.1; 248/917; 248/920
(58) Field of Search ............................. 248/349.1, 917, 248/920, 924, 678

(56) References Cited

U.S. PATENT DOCUMENTS

| | | | | |
|---|---|---|---|---|
| 3,936,026 A | * | 2/1976 | Hampel et al. | .......... 248/349.1 |
| 4,589,713 A | * | 5/1986 | Pfuhl et al. | ................. 439/162 |
| 4,919,383 A | * | 4/1990 | Benjamin et al. | ........ 248/349.1 |
| 5,079,789 A | * | 1/1992 | Jandrakovic | ............. 5/81.1 RP |
| 5,518,216 A | * | 5/1996 | Wu | ............................. 248/371 |
| 5,895,022 A | * | 4/1999 | Kim | ........................... 248/398 |
| 5,947,440 A | * | 9/1999 | Cho | ............................ 361/681 |
| 6,484,994 B2 | * | 11/2002 | Hokugoh | ..................... 248/371 |
| 6,568,646 B2 | * | 5/2003 | Wess et al. | .............. 248/349.1 |
| 6,575,420 B2 | * | 6/2003 | Yoshida et al. | ............. 248/425 |
| 6,595,481 B1 | * | 7/2003 | Huang et al. | ............ 248/349.1 |

* cited by examiner

*Primary Examiner*—Jonathon Szumny
(74) *Attorney, Agent, or Firm*—Foley & Lardner LLP

(57) ABSTRACT

In a rotary supporting base, a stationary lower base member has a top surface formed with a ring-supporting region that is confined by an outer periphery concentric with and surrounding an inner periphery, and is formed with an engaging unit on the inner and outer peripheries. A coupling ring plate is disposed at the ring-supporting region, is rotatable relative to the lower base member, and has inner and outer peripheral edges which are in sliding engagement with the engaging unit to retain rotatably the coupling ring plate on the top surface of the lower base member. A rotatable upper base member is disposed on top of the lower base member and is coupled to the coupling ring plate for co-rotation therewith relative to the lower base member. A coupling unit is provided on the coupling ring plate and the upper base member and engages an upright prop of the display device.

6 Claims, 6 Drawing Sheets

US 6,921,057 B2

ROTARY SUPPORTING BASE FOR A DISPLAY DEVICE

CROSS-REFERENCE TO RELATED APPLICATION

This application claims priority of Taiwanese Application No. 092203696, filed on Mar. 11, 2003.

BACKGROUND OF THE INVENTION

1. Field of the Invention

The invention relates to a rotary supporting base, more particularly to a rotary supporting base for a display device.

2. Description of the Related Art

Referring to FIGS. 1 and 2, a conventional rotary supporting base 900 for a liquid crystal display 800 is shown to include a stationary lower ring base member 93 and a rotatable upper ring base member 91. The lower ring base member 93 is formed with two arcuate sliding slots 935 in diametrically opposite positions. The upper ring base member 91 is disposed on the lower ring base member 93 and is rotatable relative to the lower ring base member 93 about a rotary axis. The upper ring base member 91 has a bottom surface 910, and inner and outer peripheral walls 911, 913 extending downwardly from the bottom surface 910. The bottom surface 910 is formed with a plurality of positioning plates 915 arranged along the inner and outer peripheral walls 911, 913. The positioning plates 915 arranged along the inner peripheral wall 911 cooperates with the inner peripheral wall 911 so as to confine a plurality of positioning grooves 917 engaging slidingly an inner ring rib 937 formed on a top surface of the lower ring base member 93, while the positioning plates 915 arranged along the outer peripheral wall 913 cooperate with the outer peripheral wall 913 so as to confine a plurality of positioning grooves 917 engaging slidingly an outer ring rib 937 on the top surface of the lower ring base member 93, as shown in FIG. 1. The bottom surface 910 of the upper ring base member 91 is further formed with two screw sockets 918 that correspond to the sliding slots 935 in the lower ring base member 93, respectively. Two screw fasteners 95 extend through the sliding slots 935 in the lower ring base member 93 and engage the screw sockets 918 in the upper base member 30 to fasten the upper ring base member 91 to the lower ring base member 93.

In the aforesaid configuration, the allowable extent of rotation the upper ring base member 91 depends on the lengths of the sliding slots 935 in the lower ring base member 93. As such, the extent of rotation of the upper ring base member 91 is limited when the sliding slots 935 are too short. On the other hand, when the sliding slots 935 are long enough to permit a larger extent of rotation of the upper ring base member 91, the structural strength of the lower ring base member 93 is affected adversely. Furthermore, vibration of the upper ring base member 91 during rotation of the liquid crystal display 800 may result in disengagement between the screw fasteners 95 and the screw sockets 918 and in rapid wearing of the screw fasteners 95.

SUMMARY OF THE INVENTION

Therefore, the object of the present invention is to provide a rotary supporting base that can reliably and firmly support a display device.

According to the present invention, there is provided a rotary supporting base for a display device. The rotary supporting base comprises:

a stationary lower base member having a top surface formed with a ring-supporting region that is confined by an inner periphery and an outer periphery that is concentric with and that surrounds the inner periphery, the lower base member being further formed with an engaging unit on at least one of the inner and outer peripheries;

a coupling ring plate disposed on the top surface of the lower base member at the ring-supporting region and rotatable relative to the lower base member about a rotary axis transverse to the top surface of the lower base member, the coupling ring plate having inner and outer peripheral edges, at least one of which is in sliding engagement with the engaging unit to retain rotatably the coupling ring plate on the top surface of the lower base member;

a rotatable upper base member disposed on top of the lower base member and coupled to the coupling ring plate for co-rotation therewith relative to the lower base member; and a coupling unit provided on at least one of the coupling ring plate and the upper base member and adapted to engage an upright prop of the display device.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
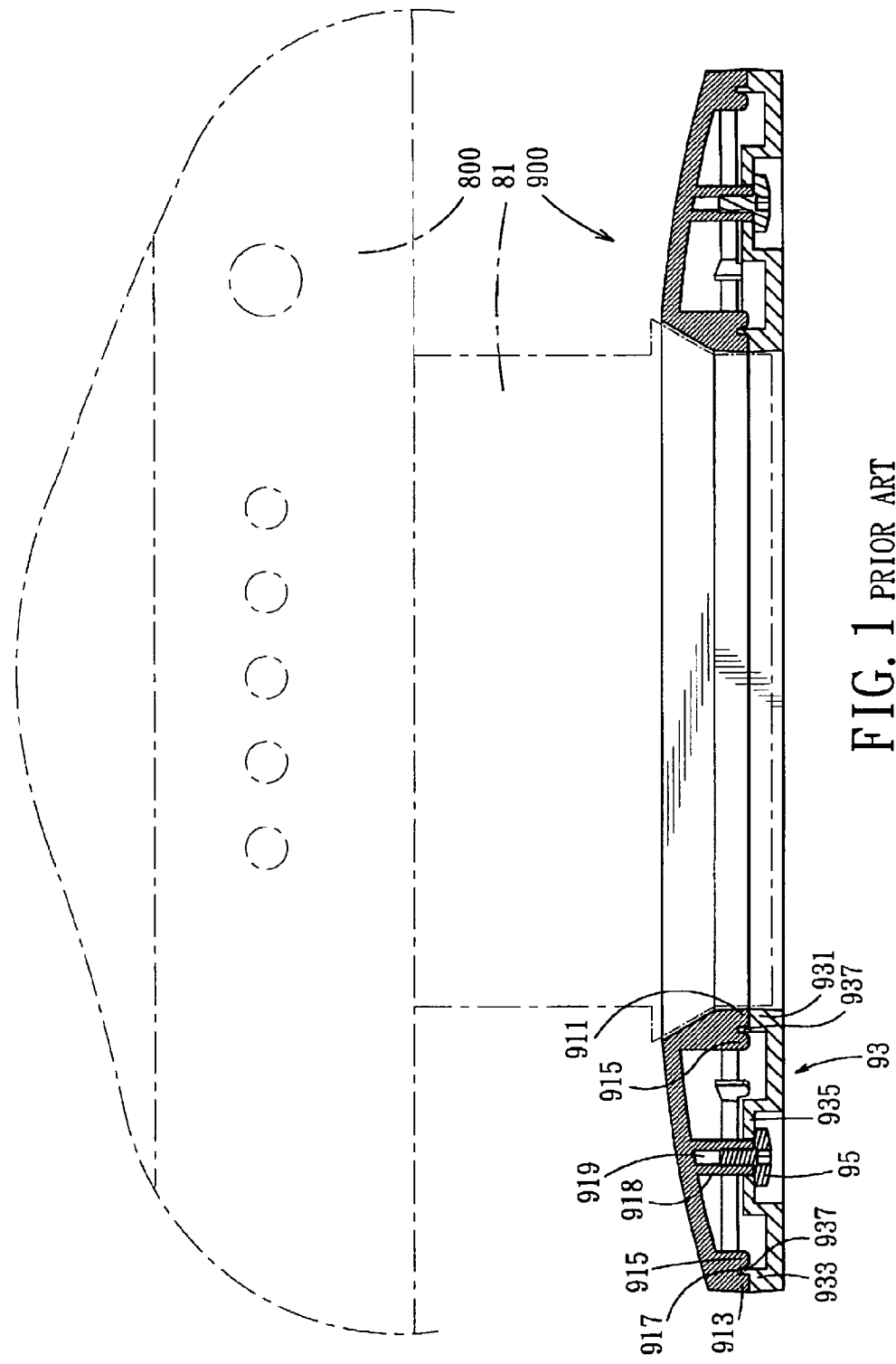
FIG. 1 is a schematic sectional view of a conventional rotary supporting base for a display device.
Figure 2:
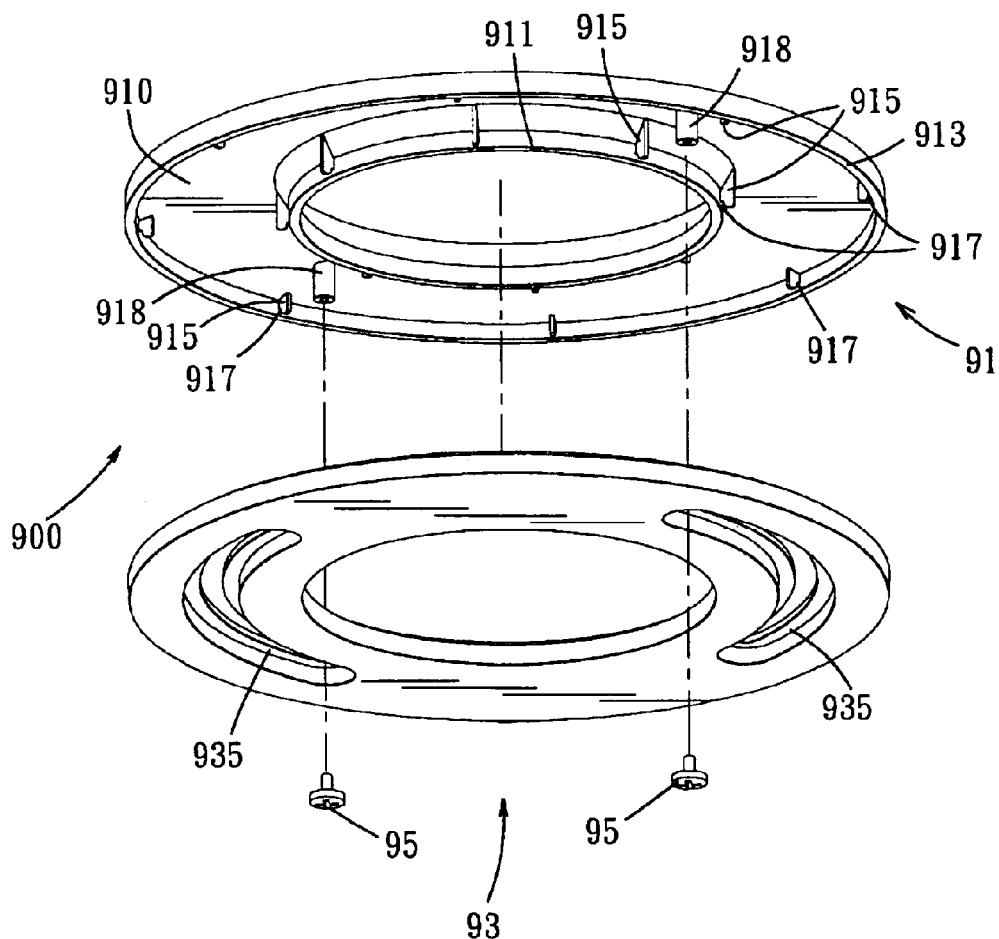
FIG. 2 is an exploded perspective view of the conventional rotary supporting base.
Figure 3:
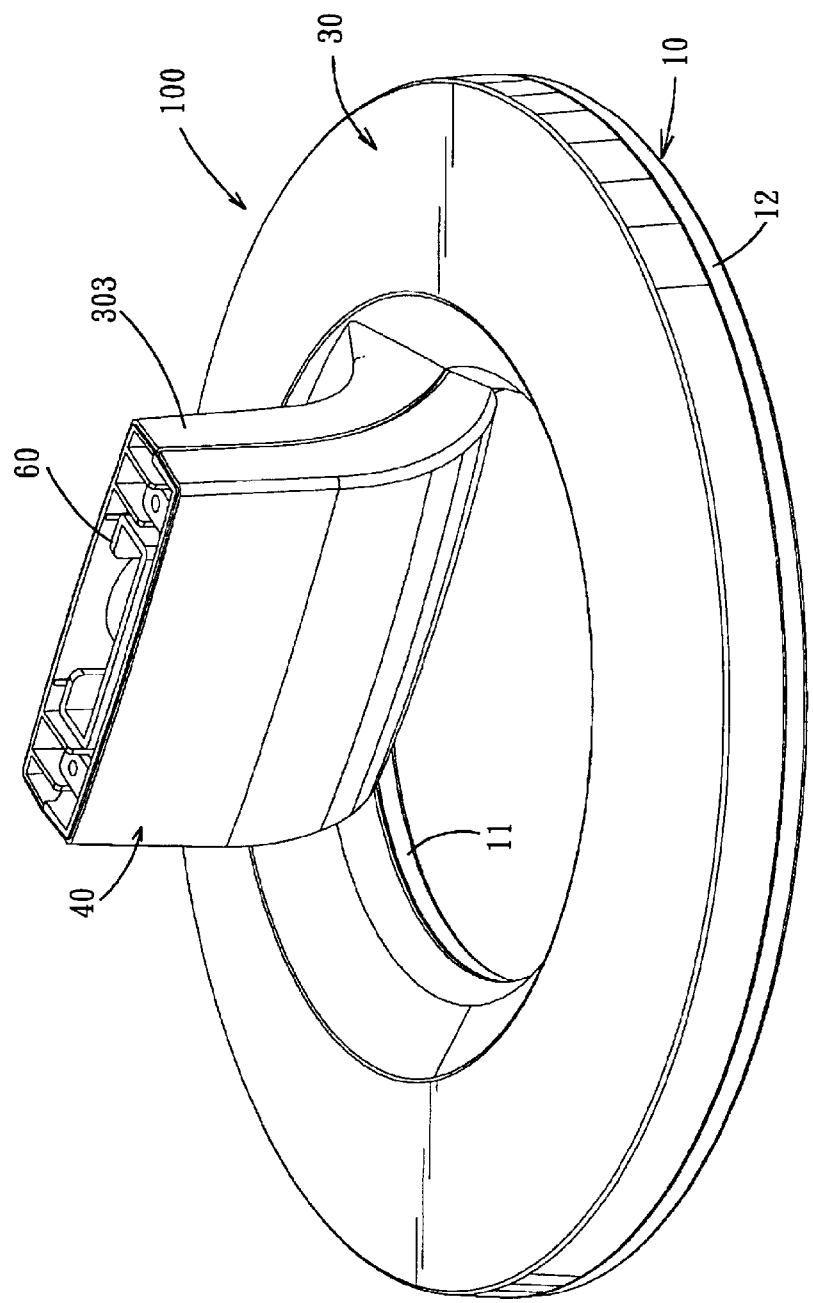
FIG. 3 is a perspective view showing the preferred embodiment of a rotary supporting base for a display device according to the present invention.
Figure 4:
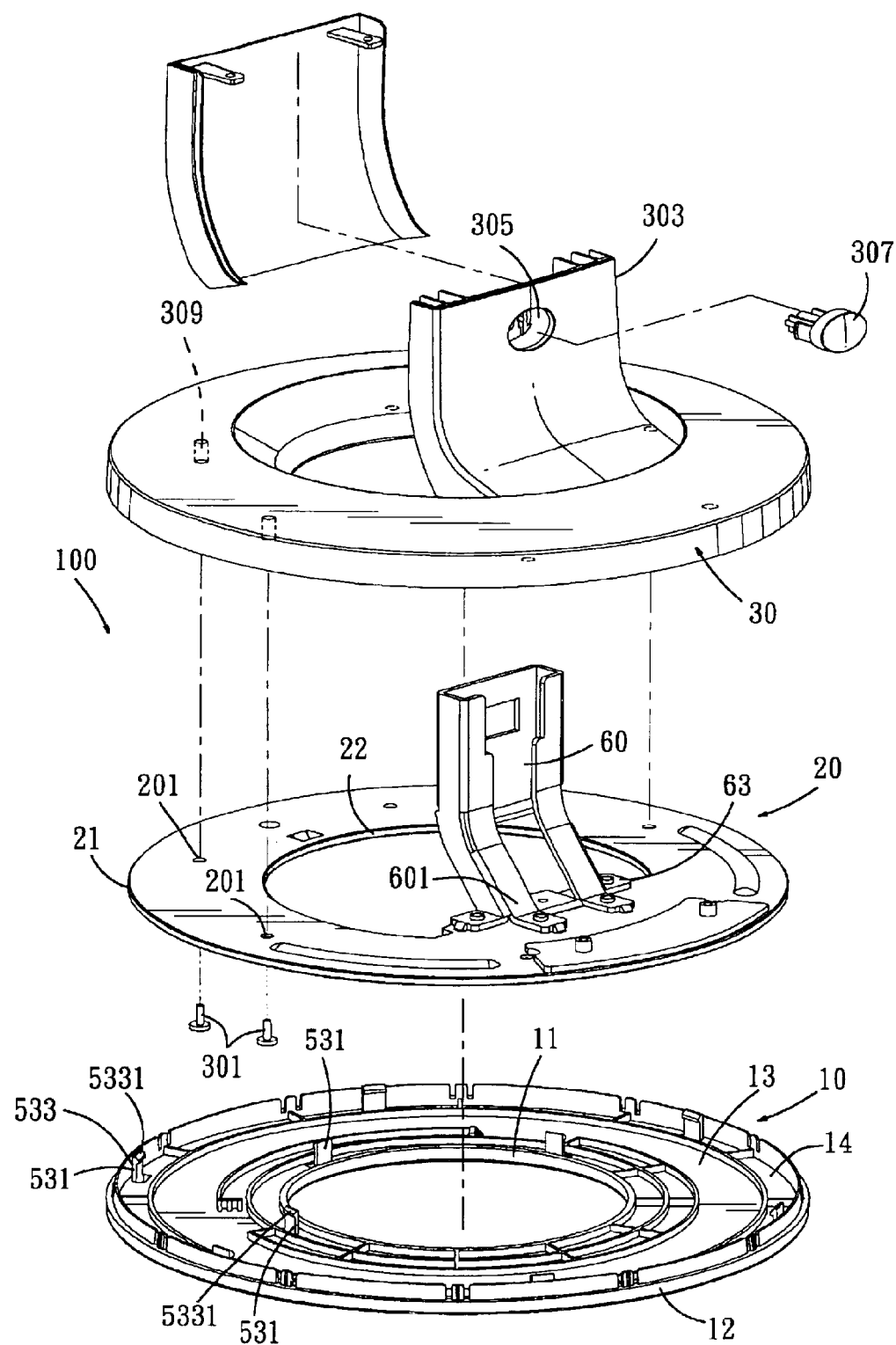
FIG. 4 is an exploded perspective view showing the preferred embodiment.

Referring to FIGS. 3 to 6, the preferred embodiment of a rotary supporting base 100 for a display device, such as a liquid crystal display 80, according to the present invention is shown to include a stationary lower base member 10, a coupling ring plate 20, a rotatable upper base member 30, and a coupling unit 40.

The lower base member 10, which is made of a plastic material, has a top surface 14 formed with a ring-supporting region 13 that is confined by an inner periphery 11 and an outer periphery 12 that is concentric with and that surrounds the inner periphery 11. The lower base member 10 is further formed with an engaging unit on the inner and outer peripheries 11, 12. In this embodiment, the engaging unit includes a plurality of resilient anchor members 531, each of which extends uprightly from the top surface 14 of the lower base member 10 and has a distal hook end 533 spaced apart from the top surface 14 of the lower base member 10. The distal hook end 533 of each anchor member 531 has an inclined guide surface 5331.

Figure 5:
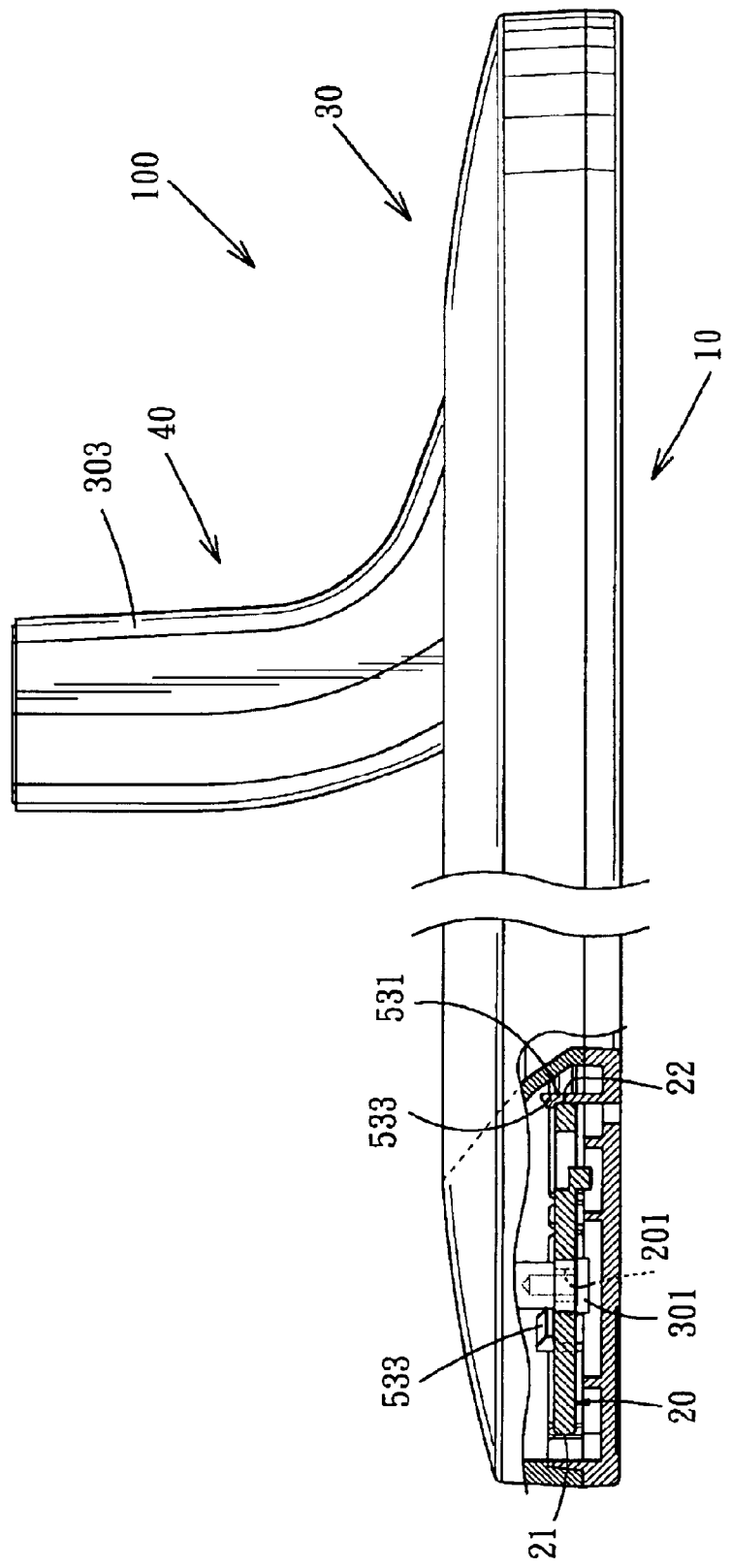
FIG. 5 is fragmentary, partly sectional schematic view showing the preferred embodiment.

The coupling ring plate 20, which is made of metal, is disposed on the top surface 14 of the lower base member 10 at the ring-supporting region 13 and is rotatable relative to the lower base member 10 about a rotary axis transverse to the top surface 14 of the lower base member 10. The coupling ring plate 20 has inner and outer peripheral edges 22, 21 that are in sliding engagement with the anchor members 531 of the engaging unit to retain rotatably the coupling ring plate 20 on the top surface 14 of the lower base member 10. The coupling ring plate 20 is formed with a plurality of fastener holes 201. The inclined guide surface 5331 of the distal hook end 533 of each anchor member 531 guides downward movement of the coupling ring plate 20 toward the ring-supporting region 13 on the top surface 14 of the lower base member 10. The distal hook end 533 of each anchor member 531 abuts against the coupling ring plate 20 to arrest upward movement of the coupling ring plate 20 away from the lower base member 10, as shown in FIG. 5.

The upper base member 30, which is made of a plastic material, is disposed on top of the lower base member 10 and is coupled to the coupling ring plate 20 for co-rotation therewith relative to the lower base member 10. The upper base member 30 has a bottom surface formed with a plurality of screw sockets 309 that are registered with the fastener holes 201 in the coupling ring plate 20. In this embodiment, a plurality of screw fasteners 301 extend through the fastener holes 201 in the coupling ring plate 20 and engage the screw sockets 309 in the upper base member 30 so as to fasten the coupling ring plate 20 to the upper base member 30.

During assembly, initially, the screw fasteners 301 extend through the fastener holes 201 in the coupling ring plate 20 and engage the screw sockets 309 in the upper base member 30 to fasten the coupling ring plate 20 to the upper base member 30. Then, due to the inclined guide surfaces 5331 of the anchor members 531, the coupling ring plate 20 coupled with the upper base member 30 can be easily forced toward the top surface 14 of the lower base member 10.

Figure 6:
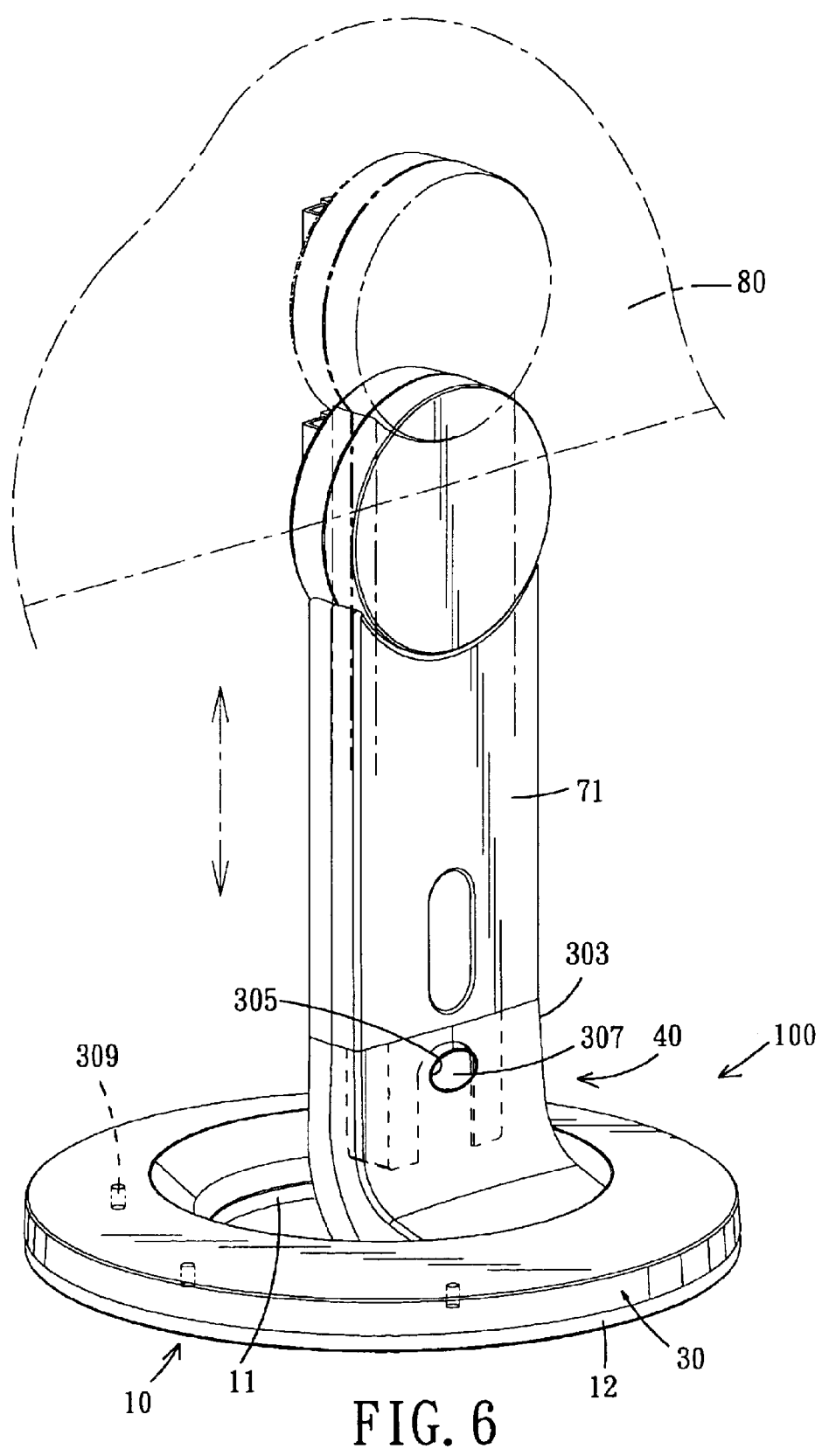
FIG. 6 is a perspective view showing the preferred embodiment in a state of use.

The coupling unit 40 is provided on the coupling ring plate 20 and the upper base member 30, and is adapted to engage an upright prop 71 of the liquid crystal display 80 (see FIG. 6). In this embodiment, the coupling unit 40 includes an outer tube segment 303, which consists of two detachable tube-confining parts, extending uprightly from the upper base member 30, and an inner tube segment 60 extending uprightly from the inner peripheral edge 22 of the coupling ring plate 20 and through the upper base member 30. In this embodiment, the inner tube segment 60 is made of metal, and has one end 601 formed with a plurality of coupling protrusions 63 that are fastened to the inner peripheral edge 22 of the coupling ring plate 20 by a plurality of screw fasteners. The inner and outer tube segments 60, 303 are configured to slidingly retain the upright prop 71 of the liquid crystal display 80. The outer tube segment 303 is provided with an engaging device (not shown) therein for engaging the upright prop 71 of the liquid crystal display 80, and an operating button 307 mounted in a mounting hole 305 that is formed in the outer tube segment 303 and operable so as to control the engaging device to engage or disengage the upright prop 71 of the liquid crystal display 80. In this embodiment, the upright prop 71 is provided with a spiral spring (not shown) therein for providing a biasing force so as to assist in adjustment of the height of the liquid crystal display 80. Since the engaging device and the spiral spring are known in the art, a detailed description of the same will be dispensed with herein for the sake of brevity.

To sum up, due to the sliding engagement between the engaging unit and the coupling ring plate 20, the rotary supporting base 100 of this invention can firmly and reliably support the liquid crystal display 80.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. A rotary supporting base for a display device, comprising:

a stationary lower base member having a top surface formed with a ring-supporting region that is confined by an inner periphery and an outer periphery that is concentric with and that surrounds said inner periphery, said lower base member being further formed with an engaging unit on at least one of said inner and outer peripheries;

a coupling ring plate disposed on said top surface of said lower base member at said ring-supporting region and rotatable relative to said lower base member about a rotary axis transverse to said top surface of said lower base member, said coupling ring plate having inner and outer peripheral edges, at least one of which is in sliding engagement with said engaging unit to retain rotatably said coupling ring plate on said top surface of said lower base member;

a rotatable upper base member disposed on top of said lower base member and coupled to said coupling ring plate for co-rotation therewith relative to said lower base member; and a coupling unit provided on at least one of said coupling ring plate and said upper base member and adapted to engage an upright prop of the display device;

wherein said coupling unit includes an outer tube segment extending uprightly from said upper base member, and wherein said coupling unit further includes an inner tube segment extending uprightly from said inner peripheral edge of said coupling ring plate and through said upper base member, said inner and outer tube segments being configured to slidingly retain the upright prop of the display device.

2. The rotary supporting base as claimed in claim 1, wherein said engaging unit includes a plurality of resilient anchor members, each of which extends uprightly from said top surface of said lower base member and has a distal hook end spaced apart from said top surface of said lower base member, said distal hook end abutting against said coupling ring plate to arrest upward movement of said coupling ring plate away from said lower base member.

3. The rotary supporting base as claimed in claim 2, wherein said distal hook end of each of said anchor members has an inclined guide surface that guides downward movement of said coupling ring plate toward said ring-supporting region on said top surface of said lower base member.

4. The rotary supporting base as claimed in claim 1, further comprising a plurality of screw fasteners for fastening said coupling ring plate to said upper base member.

5. The rotary supporting base as claimed in claim 4, wherein said coupling ring plate is formed with a plurality of fastener holes, and said upper base member is formed with a plurality of screw sockets registered with said fastener holes, said screw fasteners extending through said fastener holes and engaging said screw sockets, respectively.

6. The rotary supporting device as claimed in claim 1, wherein said inner tube segment has one end fastened to said inner peripheral edge of said coupling ring plate.

* * * * *